(12) United States Patent
Huang et al.

(10) Patent No.: US 12,440,265 B2
(45) Date of Patent: Oct. 14, 2025

(54) SYSTEM AND METHOD TO EVOKE SMOOTH MUSCLE RESPONSE DURING SURGERY

(71) Applicant: Northgate Technologies Inc., Elgin, IL (US)

(72) Inventors: Albert Yung-Hsiang Huang, Houston, TX (US); Jeffrey Paul Castleberry, Longmong, CO (US)

(73) Assignee: Northgate Technologies Inc., Elgin, IL (US)

( * ) Notice: Subject to any disclaimer, the term of this patent is extended or adjusted under 35 U.S.C. 154(b) by 458 days.

(21) Appl. No.: 18/064,856

(22) Filed: Dec. 12, 2022

(65) Prior Publication Data

US 2023/0106476 A1    Apr. 6, 2023

Related U.S. Application Data

(63) Continuation of application No. PCT/US2021/039552, filed on Jun. 29, 2021.
(Continued)

(51) Int. Cl.
*A61B 18/14* (2006.01)
*A61B 18/00* (2006.01)
*A61B 18/12* (2006.01)

(52) U.S. Cl.
CPC ..... *A61B 18/1482* (2013.01); *A61B 2018/00517* (2013.01); *A61B 2018/00702* (2013.01);
(Continued)

(58) Field of Classification Search
None
See application file for complete search history.

(56) References Cited

U.S. PATENT DOCUMENTS

| 3,662,758 A | 5/1972 | Glover |
| 4,535,771 A | 8/1985 | Takayama |

(Continued)

FOREIGN PATENT DOCUMENTS

| CN | 101594906 A | 12/2009 |
| EP | 2684525 A1 | 1/2014 |

(Continued)

OTHER PUBLICATIONS

Supplemental Extended European Search Report from EP 21832948, May 10, 2024, 9 pgs.

(Continued)

*Primary Examiner* — Michael W Kahelin
(74) *Attorney, Agent, or Firm* — Crowell & Moring LLP

(57) ABSTRACT

A smooth muscle stimulation device is intended for use with any one of a variety of electrosurgical units (ESU's) of the type used in tissue resection and other procedures that risk damage to non-target tissues. The smooth muscle stimulation devices typically include an enclosure with stimulation circuitry configured to generate a stimulatory electrical signal which when delivered to a target anatomy induces an observable response in the target anatomy during a medical procedure. An input connector on the enclosure detachably couples to a power output of the ESU, and an output connector on the enclosure detachably couples to an electrosurgical tool. Switching circuitry within the enclosure selectively connects either the power output of the ESU or the stimulatory electrical signal of the stimulation circuitry to the output connector in response to user input.

17 Claims, 5 Drawing Sheets

Related U.S. Application Data

(60) Provisional application No. 63/046,294, filed on Jun. 30, 2020.

(52) U.S. Cl.
CPC .............. *A61B 2018/00755* (2013.01); *A61B 2018/126* (2013.01)

(56) References Cited

U.S. PATENT DOCUMENTS

| | | | |
|---|---|---|---|
| 5,010,895 | A | 4/1991 | Maurer et al. |
| 5,470,308 | A | 11/1995 | Edwards et al. |
| 5,531,741 | A | 7/1996 | Barbacci et al. |
| 6,113,596 | A | 9/2000 | Hooven |
| 6,292,701 | B1 | 9/2001 | Prass et al. |
| 7,278,994 | B2 | 10/2007 | Goble et al. |
| 7,331,957 | B2 | 2/2008 | Woloszko et al. |
| 7,645,286 | B2 | 1/2010 | Catanese, III et al. |
| 7,877,152 | B2 | 1/2011 | Chu |
| 8,845,545 | B2 | 9/2014 | Folkerts et al. |
| 8,954,153 | B2 | 2/2015 | Boggs, II |
| 8,989,861 | B2 | 3/2015 | Su et al. |
| 10,413,209 | B2 | 9/2019 | Huang |
| 11,129,990 | B2 | 9/2021 | Castleberry et al. |
| 2006/0184164 | A1 | 8/2006 | Malis |
| 2009/0030473 | A1 | 1/2009 | Khawaled et al. |
| 2009/0125025 | A1 | 5/2009 | Rosemberg et al. |
| 2009/0247812 | A1 | 10/2009 | Parker et al. |
| 2009/0247817 | A1 | 10/2009 | Forsell |
| 2011/0125051 | A1 | 5/2011 | Strother |
| 2011/0301662 | A1 | 12/2011 | Bar-Yoseph et al. |
| 2012/0010326 | A1 | 1/2012 | Ganapathiappan |
| 2012/0101326 | A1 | 4/2012 | Simon et al. |
| 2013/0090641 | A1 | 4/2013 | Mckinney et al. |
| 2013/0165944 | A1 | 6/2013 | Gal et al. |
| 2013/0267874 | A1 | 10/2013 | Marcotte et al. |
| 2014/0018668 | A1 | 1/2014 | Zheng et al. |
| 2014/0171931 | A1 | 6/2014 | Sisken |
| 2015/0005841 | A1 | 1/2015 | Pal et al. |
| 2015/0119690 | A1* | 4/2015 | Deno ............... A61N 1/36 600/411 |
| 2016/0029960 | A1* | 2/2016 | Toth ............... A61B 5/6851 606/41 |
| 2017/0042445 | A1 | 2/2017 | Huang |
| 2017/0312006 | A1* | 11/2017 | McFarlin ........ A61B 18/1206 |
| 2021/0370062 | A1 | 12/2021 | Castleberry et al. |

FOREIGN PATENT DOCUMENTS

| | | |
|---|---|---|
| JP | 2010515487 A | 5/2010 |
| JP | 2014023869 A | 2/2014 |
| WO | WO-0107111 A2 | 2/2001 |
| WO | WO-2007127209 A2 | 11/2007 |
| WO | WO-2010067360 A2 | 6/2010 |
| WO | WO-2013090827 A1 | 6/2013 |
| WO | WO-2015123441 A1 | 8/2015 |
| WO | WO-2018098468 A1 | 5/2018 |
| WO | WO-2022006068 A1 | 1/2022 |

OTHER PUBLICATIONS

Chahin, et al. The implications of lighted ureteral stenting in laparoscopic colectomy. JSLS: Journal of the Society of Laparoendoscopic Surgeons 6.1 (2002): 49-52.

Da Silva, et al. Role of prophylactic ureteric stents in colorectal surgery. Asian journal of endoscopic surgery 5.3 (2012): 105-110.

EP15748565.7 Extended European Search Report dated Sep. 15, 2017.

European Supplemental Search Report Dec. 3, 2019 for EP17873428.

Fanning, et al. Cost analysis of prophylactic intraoperative cystoscopic ureteral stents in gynecologic surgery. The Journal of the American Osteopathic Association 111.12 (2011): 667-669.

PCT/US2015/015671 International Search Report and Written Opinion dated May 14, 2015.

PCT/US2017063428 International Search Report and Written Opinion dated Feb. 16, 2018.

PCT/US2021/039552 International Search Report and Written Opinion dated Dec. 9, 2021.

Roshani, et al. Pharmacological modulation of ureteral peristalsis in a chronically instrumented conscious pig model. I: Effect of cholinergic stimulation and inhibition. The Journal of urology170.1 (2003): 264-267.

Schimpf, et al. Universal ureteral stent placement at hysterectomy to identify ureteral injury: a decision analysis. BJOG: An International Journal of Obstetrics & Gynaecology 115.9 (2008): 1151-1158.

U.S. Appl. No. 15/118,689 Notice of Allowance dated Jun. 21, 2019.

U.S. Appl. No. 15/118,689 Office Action dated Feb. 15, 2019.

U.S. Appl. No. 16/420,809 Notice of Allowance dated Jun. 3, 2021.

U.S. Appl. No. 16/420,809 Notice of Allowance dated May 19, 2021.

U.S. Appl. No. 16/420,809 Office Action dated Oct. 27, 2020.

\* cited by examiner

SYSTEM AND METHOD TO EVOKE SMOOTH MUSCLE RESPONSE DURING SURGERY

CROSS-REFERENCE TO RELATED APPLICATIONS

This application is a continuation of PCT Application No. PCT/US2021/039552, filed Jun. 29, 2021, which claims the benefit of U.S. Provisional application 63/046,294, filed on Jun. 30, 2020, the full disclosure of which is incorporated herein by reference.

BACKGROUND OF THE INVENTION

1. Field of the Invention

The present invention relates to electrical stimulation and novel systems and methods for delivering these signals into target tissues during surgery to help identify smooth muscle structures and determine their functionality.

The field of surgery continues to advance at a rapid pace. Previously, the standard of care for many surgical procedures including hysterectomies, colon resections and even exploratory surgery were done with long abdominal incisions. Such "open surgical" procedures can be painful, require long recovery times, patient pain, and have undesirable side effects such as poor wound healing and incisional hernias.

As an alternative to such open surgeries, a variety of laparoscopic and other "minimally invasive" surgeries have been developed where small, typically 5 to 10 mm, incisions are made and long thin instruments inserted into the body while the operator views the surgical field via a "scope" (camera) also inserted through the abdominal wall. Such minimally invasive procedures offer decreased pain and shorter recoveries and now predominate many routine urological, obstetric, gynecological, colorectal surgeries. Recently, the use of surgical robotics has expanded the prevalence of such minimally invasive procedures even further.

Despite their manifold advantages, minimally invasive have certain shortcomings that have limited their utility. For example, the use of the small access incisions limits the ability of the surgeon to actually touch the tissue, resulting in a loss of tactile feedback. In open surgical procedures, a surgeon is often able to directly touch patient tissues and feel for structures of different textures, thicknesses, shapes and densities that are not otherwise apparent. Such tactile feedback often provided valuable information on identity and location of structures, such as blood vessels, and other critical anatomic features, such as the ureter, allowing the surgeon to avoid inflicting inadvertent damage to these otherwise invisible structures.

WO2015/123441 and WO2018/098468, having common inventorship with the present application, describe electrostimulation units having dedicated electrode probes that deliver a stimulation signal to tissue proximate a target smooth muscle anatomy, such as a ureter, to induce an observable response, typically tissue contractions, in the target anatomy during a medical procedure. By visually scanning or mapping where the responses are observed, the surgeon can avoid those area when performing a procedure, such as a resection that could damage the ureter or other target smooth muscle anatomy.

While highly effective, the need to introduce yet another electrostimulation unit having dedicated electrode probes into an already crowded surgical environment presents a challenge. While it would be theoretically possible to introduce the stimulatory signals and circuitry of WO2015/123441 and WO2018/098468 into existing ESU designs, such a transition would take many years as the present large inventory of existing ESU's is gradually replaced an upgraded over time.

It would therefore be desirable to provide devices, systems and methods that would allow a surgeon to employ the tissue identification procedures of WO2015/123441 and WO2018/098468 while continuing to use existing, commercially available ESU's and minimizing the need to introduce additional equipment into the surgical environment. In particular, it would be desirable to eliminate the need to employ separate electrosurgical probes for delivering both stimulatory signals and cutting/coagulation power to the tissue. It would be further desirable to facilitate switching between the stimulatory signal and the cutting/coagulation energy when using the same electrosurgical tool for engaging the tissue. At least some of these objectives will be met by the inventions described and claimed hereinafter.

2. Listing of Background Art

WO2015/123441 and WO2018/098468 describe previous tissue stimulation systems and have common inventorship with the present application. Other relevant patents and patent publications include U.S. Pat. Nos. 4,535,771; 5,010,895; 6,292,701; 7,877,152; 8,954,153; US2009/0247812; US2011/0301662; US2012/010326; and US2015/0005841.

SUMMARY OF THE INVENTION

A novel device and method for generating and delivering stimulation signals through existing surgical instruments during surgery while allowing the operator to switch between the ESU output and the novel system. In this way, the surgeon retains the ESU capability with their current instruments, while enjoying the added capability of tissue stimulation without needing to change instruments and interrupt workflow.

In a first aspect, the present invention provides a smooth muscle stimulation device suitable for use with an electrosurgical unit (ESU). The smooth muscle stimulation unit comprises an enclosure having stimulation circuitry therein. The stimulation circuitry is configured to generate a stimulatory electrical signal which, when delivered to a target anatomy, induces an observable response in the target anatomy during a medical procedure. An input connector is disposed on the enclosure and is configured to detachably couple to a power output of the ESU. An output connector is also disposed on the enclosure. The output connector is configured to detachably couple to an electrosurgical tool of the type normally employed in minimally invasive or other electrosurgical procedures. Switching circuitry within the enclosure is configured to selectively connect either the power output of the ESU (bypassed from the ESU) or the stimulatory electrical signal generated by the stimulation circuitry to the output connector in response to user input. In this way, the smooth muscle stimulation device of the present invention can be combined with a conventional, commercially available ESU allowing the benefits of tissue stimulation and observance to be available with minimal additional equipment and disruption to the surgical environment.

In a specific embodiment, the stimulation circuitry is configured to elicit a peristaltic response from a ureter when an electrode on the electrosurgical tool is positioned proximate a patient's ureter in a minimally invasive, open surgical, or other procedure. Exemplary electrosurgical tools include graspers, scissors, irrigators, dissectors, resectors, suction devices, and the like having electrodes or other electrically conductive surfaces configured to be coupled to the output connector on the enclosure. This list is not meant to be exhaustive.

While the smooth muscle stimulation device of the present invention will most often be a bipolar device, in other instances the smooth muscle stimulation device may be configured to operate with monopolar electrosurgical instruments when the ESU operates in a monopolar mode together with a dispersion pad.

In a preferred embodiment, the stimulation circuitry of the present invention may comprise a power supply configured to deliver an undriven capacitive discharge with a pulse control. Typically, the stimulation circuitry will further comprise a controller configured to control a pulse output from the power supply.

In most instances, the smooth muscle stimulation device of the present invention will comprise a user interface on the enclosure configured to control the switching circuitry in response to user input via the interface. The user interface will typically include at least one selector which allows the user to selectively connect either the power of the ESU or the stimulatory electrical signal of the stimulation circuitry to the output connector in order to deliver the selected signal for current to the electrosurgical tool. In some examples, the selector may comprise a first push button to select a stimulation mode and a second push button to select an electrosurgical mode, where the two buttons and circuits are typically locked out so they cannot be selected simultaneously. In other instances, the selector may be a simple to position switch.

As discussed briefly above, the stimulation device of the present invention is intended to be utilized with any one of a variety of commercially available ESU's. As such, the stimulation devices of the present invention will often include a plurality of output plug adapters configured to provide a bridge or interface between the power input on the enclosure and a power output cable from the ESU. In some instances, the adapter may be incorporated into a connector cable where one end of the cable is adapted to plug into the ESU, and the other end of the cable is adapted to plug into the stimulation device enclosure.

Similarly, the smooth muscle stimulation device of the present invention may further comprise a plurality of output plug adapters, where individual output plug adapters are configured to provide a bridging electrical connection between the output connector on the enclosure of the stimulation device and a connecting cable or cord of the electrosurgical tool. These adaptors enable the stimulation device and enclosure to be connected to a wide variety of commercially available electrosurgical tools which may have different connector patterns and plugs.

While particularly useful in combination with an ESU, as described above, the smooth muscle stimulation device of the present invention typically include an independent power supply and will also find use as "stand alone" devices (independently of an ESU or other electrosurgical apparatus) for stimulation of target tissue for nerve identification and/or location or other purposes. When used independently, the switching component will be enabled to deliver the stimulatory electrical signal of the stimulation circuitry to the tool output and, optionally, pass though connection of the ESU input (typically empty) will be disabled.

In a second aspect, the present invention provides smooth muscle stimulation systems including a smooth muscle stimulation device as described above in combination with an ESU comprising the power output. The ESU may be specially designed to interface with the smooth muscle stimulation systems of the present invention but will more often be a commercially available ESU acquired separately from the stimulation system of the present invention.

In third aspect, the present invention provides methods for assembling a smooth muscle stimulation system with an ESU to selectively output electrical stimulation energy. The method comprises providing an enclosure comprising an electrical stimulator having a stimulation signal output and an ESU having a power output. The power output of the ESU is connected to an input connector on the enclosure, and an electrosurgical tool is connected to an output connector on the enclosure. The output connector is selectively switched to receive current from either (1) the power output of the ESU or (2) the stimulatory electrical signal of the stimulation circuitry in response to user input and to deliver the received current to the electrosurgical tool.

In specific instances, the methods further comprise energizing the electrical stimulator to deliver a stimulation signal to the electrosurgical tool, engaging an electrode surface on the electrosurgical tool against target tissue proximate a target smooth muscle, and observing the target tissue to detect a contraction induced by the stimulation signal, indicating the presence of a smooth muscle in or near the engaged tissue. Once it has been determined that a portion of the target tissue is free from smooth muscle or other target anatomy, and electrode surface of the electrosurgical tool may be engaged against the tissue surface based on the absence of tissue contraction. After engagement, the ESU may be energized to deliver power to the tissue engaged by the electrode, typically electrosurgical power for cutting, coagulation, or other tissue-modifying results.

In exemplary embodiments, selectively switching the output connector comprises manually selecting a switch positioned on the exterior of the enclosure to control switching circuitry inside of the enclosure. For example, switching may comprise selectively engaging either a first selector button to energize the electrical stimulator to delivers a stimulatory signal to the tissue or a second selector button to allow the switch to deliver bypass current from the ESU to the electrosurgical tool. Alternatively, switching the output connector may comprise operating a two-position selector switch to select either the stimulatory signal or the power output from the ESU for delivery to the patient.

In specific instances, the methods of the present invention may be utilized to treat target tissue selected from the group consisting of a ureter, a bladder, a stomach, and esophagus, and intestine, and the like. In an exemplary embodiment, the stimulation output elicits a peristaltic response from a ureter when an electrode on the electrosurgical tool is positioned proximate the patient's ureter. Methods may comprise any one of a variety of conventional and non-conventional electrosurgical procedures, including bipolar procedures, monopole or procedures, grasping, cutting, suction, tissue dissection, tissue resection, and the like.

DETAILED DESCRIPTION OF THE INVENTION

The smooth muscle stimulation device of the present invention is intended for use with any conventional or non-conventional electrosurgical unit (ESU) which delivers radiofrequency or other current to patients for therapeutic, diagnostic, or other purposes. The smooth muscle stimulation devices will be configured to deliver pulse patterns and other waveforms of a type known to stimulate tissue contraction in order to allow a surgeon to visually identify smooth muscle targets, such as a ureter, which might be damaged by the electrosurgical procedure.

The smooth muscle stimulation devices of the present invention are configured to interconnect with the ESU to allow the surgeon to use the combination as a single unit or assembly, simplifying operation, saving space, and eliminating redundancy in the surgical environment. In particular, the smooth muscle stimulation device can be assembled with the ESU to have a single footprint and the electrosurgical tools commonly used with the ESU can be used as probes for delivering the stimulatory signals to the target tissue, eliminating the need for dedicated probes.

In this way, the surgeon has the option to select and switch between the tissue stimulatory signal and the ES power output signal at any time during a procedure, and the change does not require a change of the electrosurgical tool that is being used. The surgeon does not have to change tools or their field of view, thus providing a seamless workflow experience to maintain a safe and efficient surgical environment.

The novel device has a relay internally to change the output to the instruments back and forth from the novel smooth muscle stimulation signal to allowing a pass-through of the electrosurgical signal from the electrosurgical generator in the operating room. Both the novel device and the electrosurgical generator would be operated independently with their own foot pedal both for safety and precision.

Figure 1A:
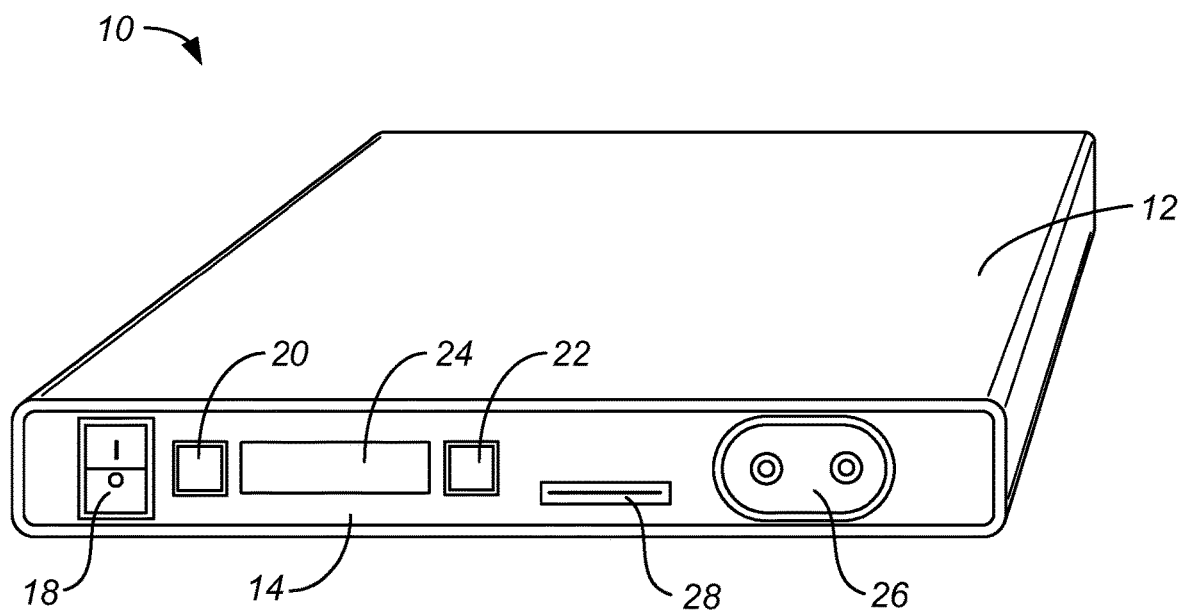
FIG. 1A is a perspective view of a smooth muscle stimulation device constructed in accordance with the principles of the present invention showing the front panel.
Figure 1B:
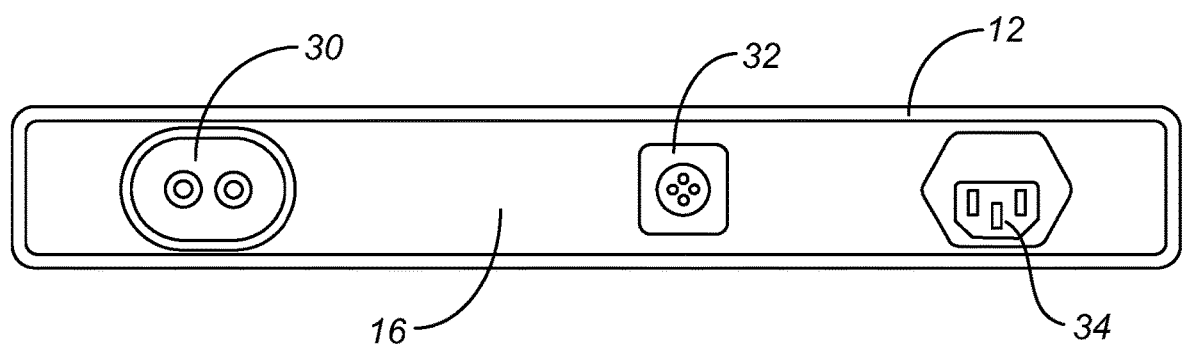
FIG. 1B is a view of the back panel of the smooth muscle stimulation device of FIG. 1A

Referring now to FIGS. 1A and 1B, a smooth muscle stimulation device 10 constructed in accordance with the principles of the present invention comprises an enclosure 12 having a front face 14 and a back face 16. The front face has a user interface including a power switch 18, a stimulation selector button 20, and ESU selector button 22, and a display, typically an LED or LCD display. The front face further includes an electrosurgical tool output receptacle 26 and a slot 28 configured to receive and activation card. The activation card will provide authorization to utilize the system for particular patients and/or particular procedures. The electrosurgical tool output receptacle will typically be configured to receive one or more adapters which allow a variety of conventional electrosurgical tools to be plugged in for use in the procedures described hereinbelow.

The back face 16 of the enclosure 12 includes an electrosurgical unit (ESD) connector. The input connector will be configured to receive the output of the conventional ESU, often requiring the use of an adapter to interface with a proprietary ESU connector and bridge to the standard connector 26 on the enclosure 12. The back face 16 of the enclosure 12 also includes a foot switch connector 32 and a power cord connector 34. As described in more detail below, a foot switch 54 will be provided to allow the surgeon to turn on and off the stimulatory current from the smooth muscle stimulation device 10 when the stimulation selector button 20 has been depressed. While usually a separate foot switch or pedal will be provided for the ESU, in some instances it may be desirable to combine the foot switch function for both the stimulation device and the ESU in a single connector.

Figure 2:
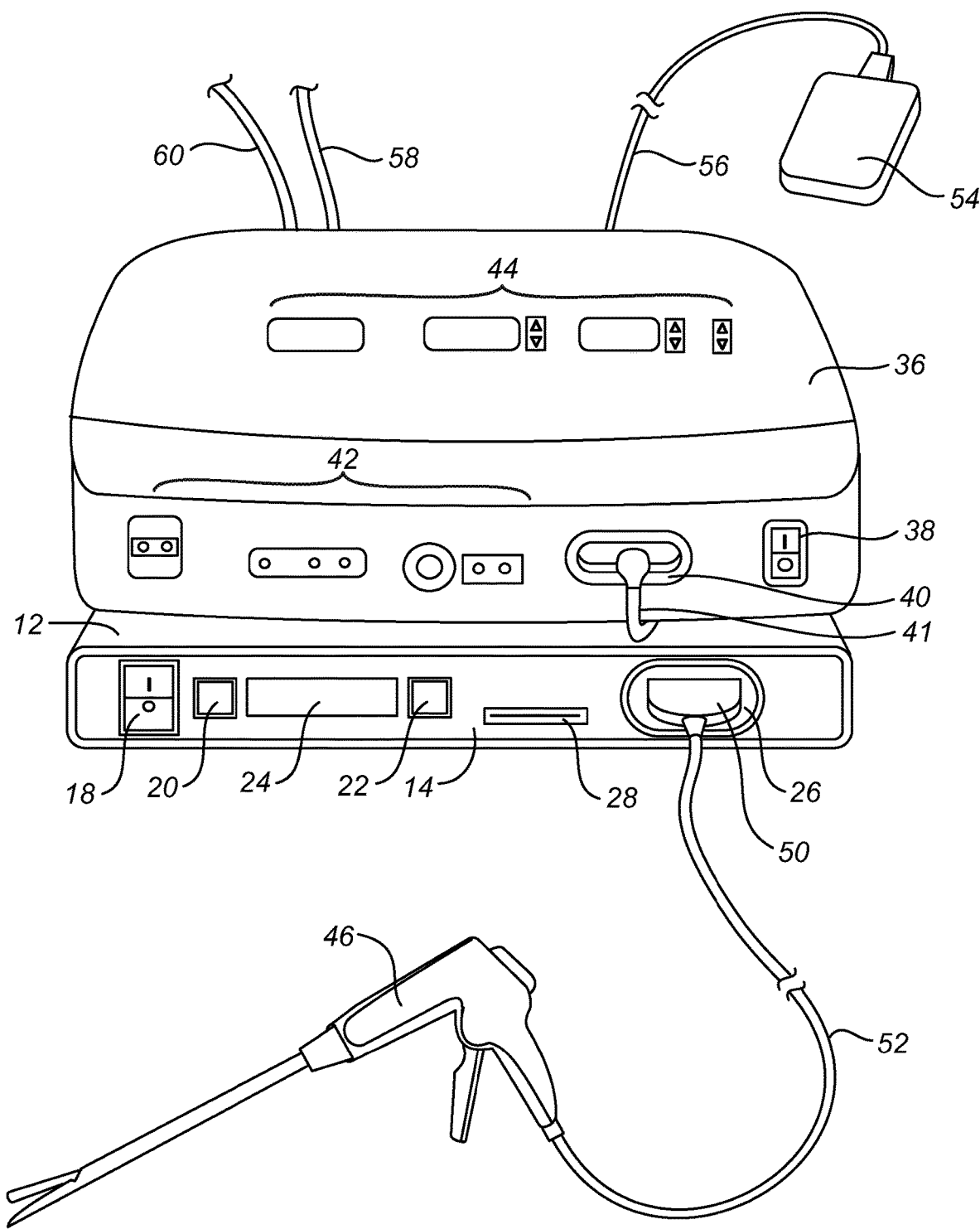
FIG. 2 illustrates the smooth muscle stimulation device of FIGS. 1A and 1B interconnected with a conventional electrosurgical unit (ESU) and further connected to a conventional electrosurgical instrument and footswitch via cables.

Referring now to FIG. 2, the smooth muscle stimulation device 10 is shown in an assembly with a standard or conventional ESU 36. While the ESU will have a number of features which allow its normal performance in performing electrosurgeries, those features which are relevant to the present invention include a power switch 38, and an ESU power out receptacle 40. A number of other connectors 42 will typically be found on a front face of the ESU while a number of displays and controls 44 will be found on the top of the ESU.

In order to interconnect the smooth muscle stimulation device 10 and the ESU 36, a cable 41 is plugged in at one end to the ESU power out receptacle and at the other end to the ESU input connector 30 on the back face of the smooth muscle cells stimulation device, as shown in FIG. 1B. Thus, the normal power output of the ESU is directed to the enclosure 12 where it will be bypassed to the electrosurgical tool output connector 26 on the front face 14 of the stimulator device.

A conventional electrosurgical tool 46, illustrated in FIG. 2 as a tissue resector, is connected by a cable 52 and plug 52 to the output receptacle 26. As will be described in more detail with respect to FIGS. 3 and 4, the smooth muscle stimulation device 10 is configured to selectively deliver either a muscle stimulatory current or signal generated by the stimulator device or a power current generated by the ESU to the electrosurgical tool 46 for use in the methods of the present invention.

Figure 3:
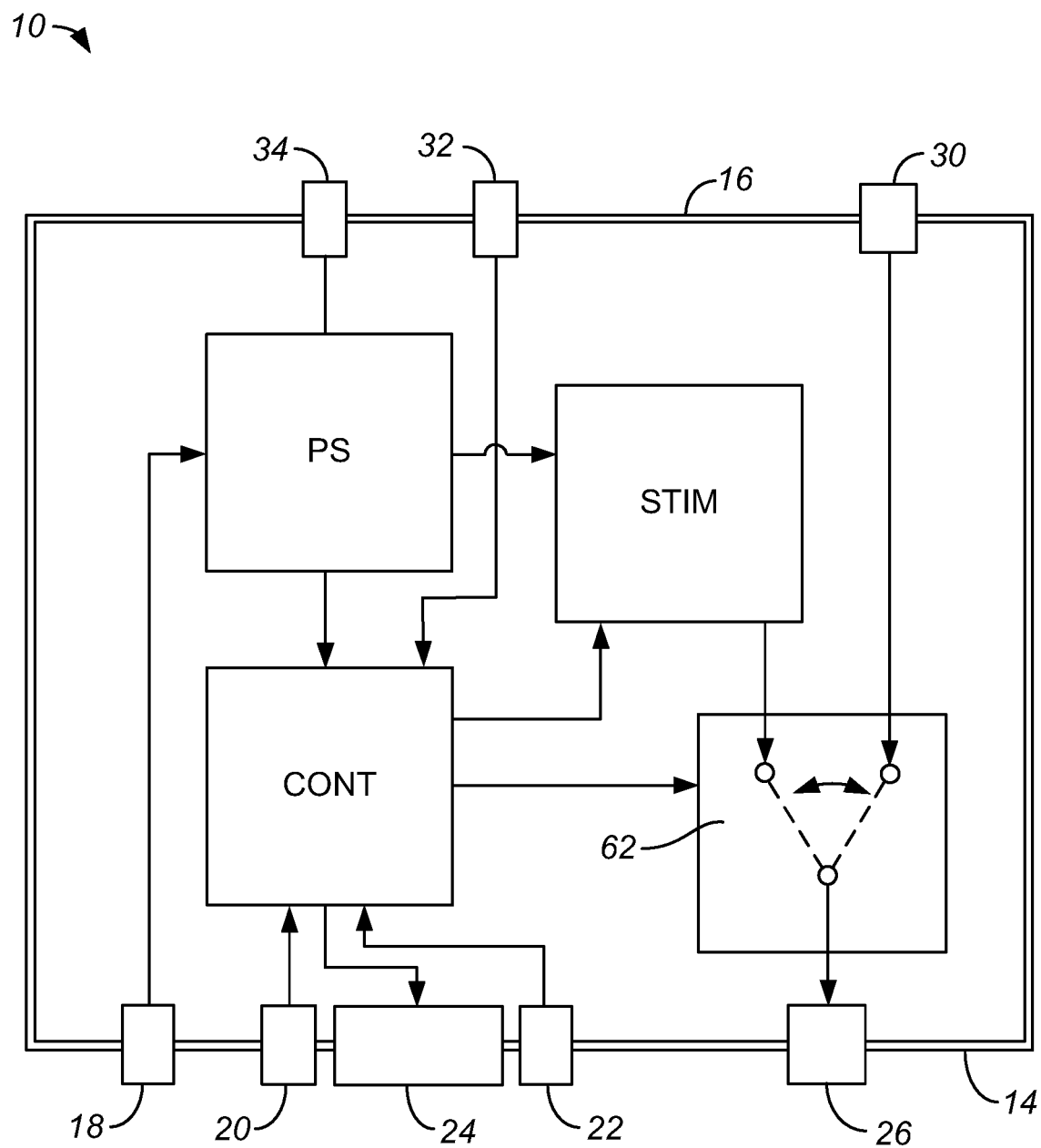
FIG. 3 is a schematic diagram of the components and circuitry within the smooth muscle stimulation device of FIGS. 1A and 1B.

Referring now to FIG. 3, the smooth muscle stimulatory device 10 includes a power supply PS, a controller CONT, a stimulation current generator STIM, and a switch module 62 within its interior. The power supply PS receives line current directly from the power cord connector 34 and delivers low voltage direct current to each of the controller CONT and the stimulation current generator STIM. The power supply PS is controlled by our switch 18 on the front of the enclosure 12.

The controller CONT receives input from both the stimulation selector button 20 and the ESU selector button 22 as well as providing output to the display 24. In this way, the controller CONT can control function of the stimulator STIM as well as controlling the switching function of the switch module 62. The switching module 62 is shown as a simple single pole, double throw switch (SPDT) but will usually be implemented using power relays to selectively direct the output of either the low voltage stimulator STIM or the high-voltage, high current ESU output to the electrosurgical tool output connector 26. In summary, when the surgeon presses the stimulation selector button 20, the controller CONT will cause the switching module 62 to connect the output of the stimulator STIM to be directed to the output 26. When the ESU selector button 22 is depressed, the ESU output entering through ESU input connector 30 is passed through to the electrosurgical tool output receptacle 26. The surgeon can thus select what type of current is being applied through the electrosurgical tool 46 simply by choosing the appropriate button on the front of the enclosure 12. Of course other switches and means could be provided for implementing such switching, including other types of switches, verbal instructions, and the like.

Figure 4:
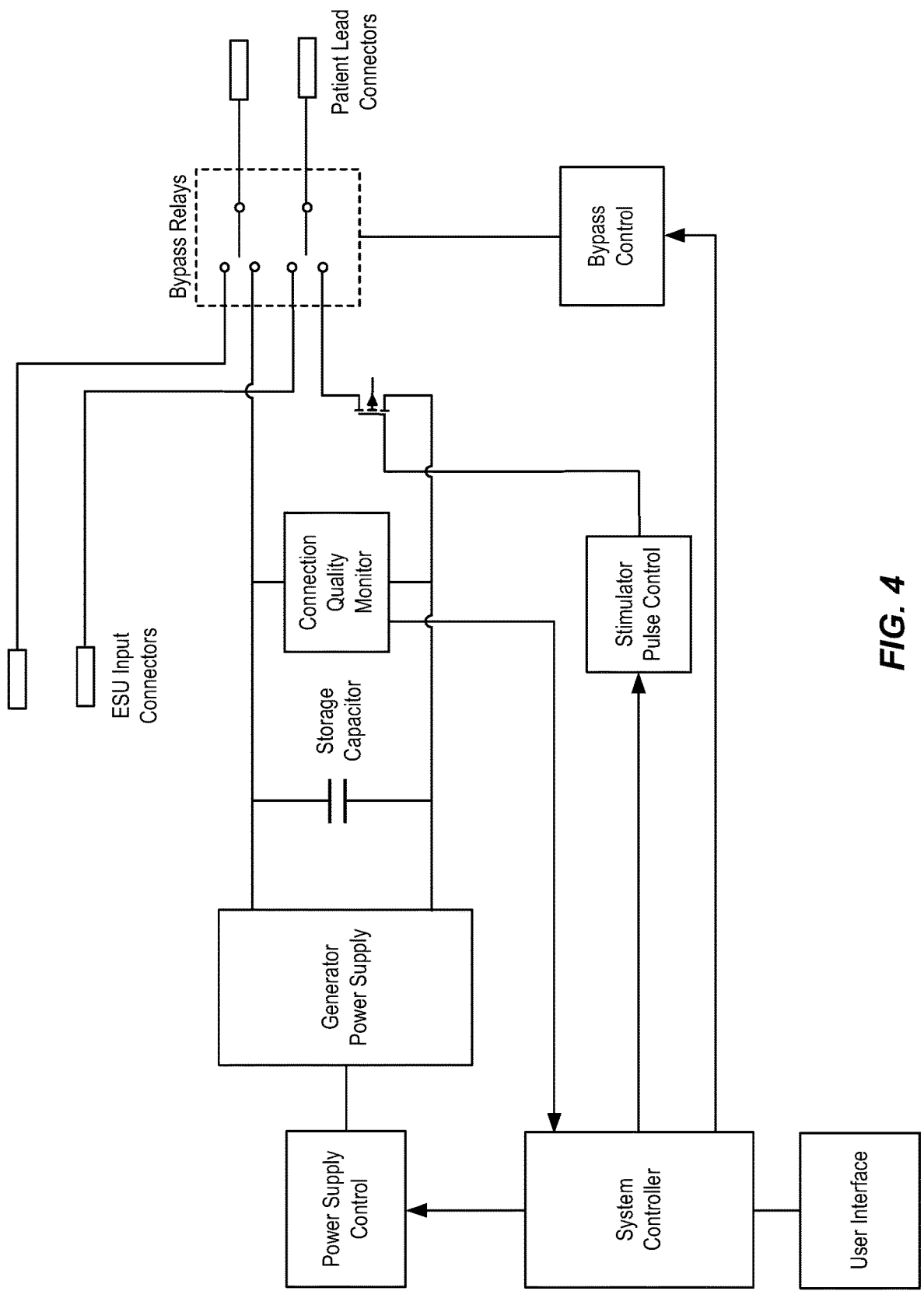
FIG. 4 is a generalized schematic diagram of the components and circuitry of devices constructed in accordance with the principles of the present invention.

Referring now to FIG. 4, an alternate illustration of the circuitry of the smooth muscle stimulation device 10 is provided. As shown, a user interface is connected to a system controller which in turn controls a stimulator pulse control and a bypass control. The stimulator pulse control and bypass control, together, operate the bypass relays which selectively deliver a stimulation current from a generator power supply with a storage capacitor to the patient lead outputs in one instance. Or, in an alternative instance, deliver the output of the ESU input connectors to the patient lead connectors. The system is monitored by a connection quality monitor which feeds back information to the system controller to provide user, e.g. to provide information enabling proper clinical use of the device.

Figure 5:
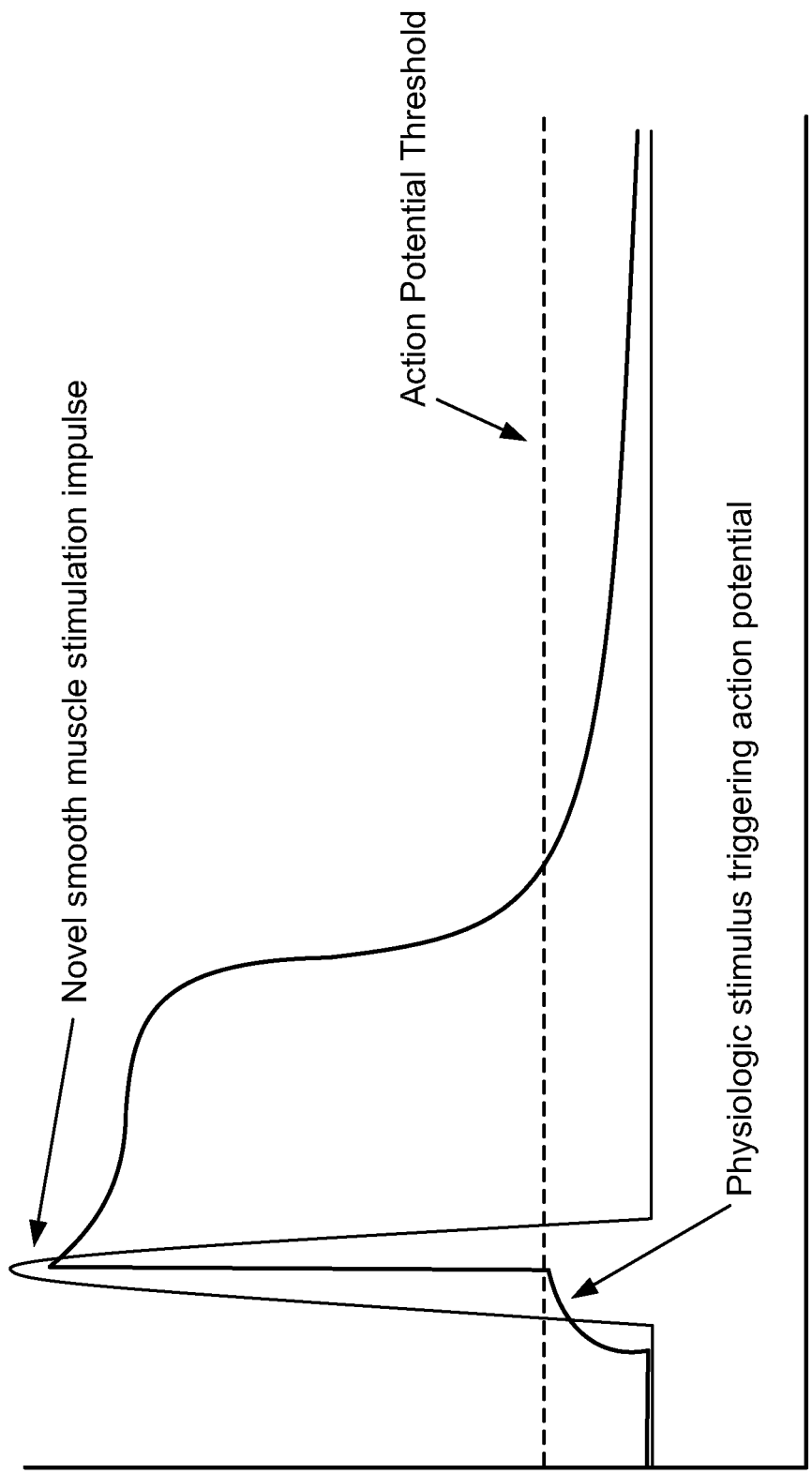
FIG. 5 illustrates the muscle stimulation potentials generated by the smooth muscle stimulation device of the present invention.

As shown in FIG. 5, the smooth muscle stimulation device of the present invention produces an electrical impulse that is designed specifically for smooth muscle stimulation. Smooth muscles, especially the ureter, rely on a proximal stimulation to trigger a contraction cascade that presents as visible peristalsis. The stimulatory impulse of the present invention mimics the initial excitatory signal that triggers a contractile cascade smooth muscle. Upon signal delivery, the ureteric smooth muscle depolarizes and contracts in the physiologic wave-like movement known as vermiculation. Via gap junctions, the action potential then naturally and automatically travels from one cell to another resulting in a propagating, visible contraction that naturally extends the entire length of the ureter.

The stimulatory signal generated by the novel device is a single brief impulse that is non-sustained and has no inherent frequency and is of a short duration as to be able to trigger depolarization, but not be so long as to impede the subsequent depolarization cascade of smooth muscle structures that translate into visible peristalsis in the clinical and surgical setting (FIG. 5). The duration of the stimulatory signal is important as the decay of the waveform cannot be prolonged as that would interfere with the subsequent propagation of the action potential triggered by the stimulatory signal.

Along with generating this specific stimulatory signal and delivering through existing surgical instruments into the surgical field and into the patient during surgery, it is important that the surgeon is made aware of both the successful delivery of this signal into the desired tissues as well as any error (assembly or user) that may arise.

The stimulation devices of the present invention device may have a small speaker within the enclosure that delivers a single tone when the stimulation button is selected, the foot pedal is depressed, and the stimulation signal is delivered into the appropriate tissues. The connection quality monitor control comprises a built in impedance monitoring system that detects the resistance of the tissues that the instrument is touching that the stimulation signal was delivered into. With the general knowledge that tissues inside the body (as would be operated on during minimally invasive surgery) have a resistance of a modest range around 300Ω, if the novel device senses that the stimulation signal was delivered into a resistance too far above (>1000Ω) or below (<10Ω) this range, it will give a multiple short tone sound paired with a visual alert on the LCD screen.

Too high of an encountered resistance would either mean that both tips of the surgical instruments were not touching the target tissue (thus infinite S) with an open circuit), or that they were touching incorrect tissue such as skin which has an extremely high resistance. Too low of a resistance could either mean that the tips of the instruments were touching each other (effectively 0Ω or a short circuit) or that the tissue surface may have too much fluid on it resulting in the desired signal potentially not reaching the target tissues. Thus, by monitoring impedance between the bipolar leads on the electrosurgical device, any of these potential operating anomalies can be detected and optionally alarmed.

To ensure truly seamless workflow experience, it remains important to ensure that the novel device allows for surgeons to connect as many of their existing instruments to it as possible. With many instruments on the market being single use disposables with specially designed plugs, a series of plug adapters can accompany the system during installations. The design of the adapters is fundamentally to ensure that the instruments are able to be used as intended, but when desired, can be selected to deliver the smooth muscle stimulation signal through their instrument tips/end effectors.

In most cases, the adapters simply need to have a different configuration and spacing of the male/female prongs, but in others, additional components need to be present in the adapter housing. These include RFID signal extenders and a camera system that captures a QR code on an instrument plug and projects it via a small screen on the adapter for an ESU to read.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A smooth muscle stimulation device for use with an electrosurgical unit (ESU), said smooth muscle stimulation device comprising:
   an enclosure;
   stimulation circuitry within the enclosure configured to generate a stimulatory electrical signal which when delivered to a target anatomy induces an observable response in the target anatomy during a medical procedure;
   an input connector on the enclosure configured to detachably couple to a power output of the ESU;
   an output connector on the enclosure configured to detachably couple to an electrosurgical tool; and
   switching circuitry within the enclosure configured to selectively connect either the power output of the ESU or the stimulatory electrical signal of the stimulation circuitry to the output connector in response to user input;
   wherein the stimulation circuitry comprises a power supply configured to deliver an undriven capacitive discharge and a pulse control.

2. A smooth muscle stimulation device according to claim 1, wherein the stimulation circuitry is configured to elicit a peristaltic response from a ureter when an electrode on the electrosurgical tool is positioned proximate a patient's ureter.

3. A smooth muscle stimulation device according to claim 1, wherein the electrosurgical tool is selected from the group consisting of graspers, scissors, irrigators, dissectors, resectors, suction devices having electrically conductive surfaces configured to be coupled to the output connector on the enclosure.

4. A smooth muscle stimulation device according to claim 1, wherein the input connector and the output connector are bipolar.

5. A smooth muscle stimulation device according to claim 1, wherein the stimulation circuitry further comprises a controller configured to controls a pulse output from the power supply.

6. A smooth muscle stimulation device according to claim 5, wherein the controller is further configured to control the switching circuitry in response to a user interface on the enclosure.

7. A smooth muscle stimulation device according to claim 6, wherein the user interface comprises at least one selector to allow the user to selectively connect either the power output of the ESU or the stimulatory electrical signal of the stimulation circuitry to the output connector.

8. A smooth muscle stimulation device according to claim 7, wherein the at least one selector comprises a first push button to select a stimulation mode and a second to select an electrical surgical mode.

9. A smooth muscle stimulation system comprising:
an electrosurgical unit (ESU) comprising the power output; and
a smooth muscle stimulation device according to claim 1.

10. A smooth muscle stimulation device for use with an electrosurgical unit (ESU), said smooth muscle stimulation device comprising:
an enclosure;
stimulation circuitry within the enclosure configured to generate a stimulatory electrical signal which when delivered to a target anatomy induces an observable response in the target anatomy during a medical procedure;
an input connector on the enclosure configured to detachably couple to a power output of the ESU;
an output connector on the enclosure configured to detachably couple to an electrosurgical tool;
switching circuitry within the enclosure configured to selectively connect either the power output of the ESU or the stimulatory electrical signal of the stimulation circuitry to the output connector in response to user input; and
a plurality of input plug adapters, wherein each input plug adapter is configured to provide a bridging electrical connection between the input connector on the enclosure and the power output of one of a plurality ESU's.

11. A smooth muscle stimulation device for use with an electrosurgical unit (ESU), said smooth muscle stimulation device comprising:
an enclosure;
stimulation circuitry within the enclosure configured to generate a stimulatory electrical signal which when delivered to a target anatomy induces an observable response in the target anatomy during a medical procedure;
an input connector on the enclosure configured to detachably couple to a power output of the ESU;
an output connector on the enclosure configured to detachably couple to an electrosurgical tool;
switching circuitry within the enclosure configured to selectively connect either the power output of the ESU or the stimulatory electrical signal of the stimulation circuitry to the output connector in response to user input; and
a plurality of output plug adapters wherein each output plug adapter is configured to provide a bridging electrical connection between the output connector on the enclosure and one of a plurality of electrosurgical tools.

12. A method for assembling a smooth muscle stimulation system with an electrosurgical unit (ESU) to selectively output electrical stimulation energy and electrical power, said method comprising:
providing an enclosure comprising an electrical stimulator having a stimulation signal output;
providing an electrosurgical unit (ESU) having a power output;
connecting the power output of the ESU to an input connector of the enclosure;
connecting an electrosurgical tool to an output connector of the enclosure;
selectively switching the output connector to receive current from either (1) the power output of the ESU or (2) the stimulatory electrical signal of the stimulation circuitry in response to user input and to deliver the received current to the electrosurgical tool;
energizing the electrical stimulator to deliver a stimulation signal to the electrosurgical tool, engaging an electrode surface on the electrosurgical tool against target tissue proximate target smooth muscle anatomy, and observing the target tissue to detect a contraction induced by the stimulation signal, indicating the presence of the target smooth muscle anatomy in or near the engaged tissue; and
engaging the electrode surface against a tissue surface which has been determined free of target smooth muscles based upon the absence of tissue contraction and energizing the ESU to deliver power to said tissue surface.

13. A method according to claim 12, wherein the target tissue is selected from the group consisting of a ureter, a bladder, a stomach, an esophagus, and an intestine.

14. A method according to claim 12, wherein the stimulation signal output elicits a peristaltic response from a ureter when an electrode on the electrosurgical tool is positioned proximate a patient's ureter.

15. A method for assembling a smooth muscle stimulation system with an electrosurgical unit (ESU) to selectively output electrical stimulation energy and electrical power, said method comprising:
providing an enclosure comprising an electrical stimulator having a stimulation signal output;
providing an electrosurgical unit (ESU) having a power output;
connecting the power output of the ESU to an input connector of the enclosure;
connecting an electrosurgical tool to an output connector of the enclosure; and
selectively switching the output connector to receive current from either (1) the power output of the ESU or (2) the stimulatory electrical signal of the stimulation circuitry in response to user input and to deliver the received current to the electrosurgical tool;

wherein selectively switching the output connector comprises manually selecting a switch position on the enclosure to control switching circuitry with the enclosure.

16. A method according to claim 15, wherein manually selecting comprises selectively engaging a first selector button for the electrical stimulator or a second selector button for the ESU.

17. A method according to claim 15, wherein manually selecting comprises operating a selector switch having first position that enables the electrical stimulator and a second position that enables the ESU.

* * * * *